(12) United States Patent
Niewiadomski et al.

(10) Patent No.: US 10,870,323 B2
(45) Date of Patent: Dec. 22, 2020

(54) COMPENSATION FOR TRAILER COUPLER GEOMETRY IN AUTOMATIC HITCH OPERATION

(71) Applicant: Ford Global Technologies, LLC, Dearborn, MI (US)

(72) Inventors: Luke Niewiadomski, Hamtramck, MI (US); George Edmund Walley, III, Novi, MI (US); Chen Zhang, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 16/038,462

(22) Filed: Jul. 18, 2018

(65) Prior Publication Data

US 2020/0023695 A1    Jan. 23, 2020

(51) Int. Cl.
| | |
|---|---|
| *B60D 1/36* | (2006.01) |
| *B62D 15/02* | (2006.01) |
| *G05D 1/02* | (2020.01) |
| *B60T 7/12* | (2006.01) |
| *B60W 30/18* | (2012.01) |
| *B60R 1/00* | (2006.01) |

(52) U.S. Cl.
CPC ............. *B60D 1/36* (2013.01); *B62D 15/025* (2013.01); *G05D 1/0246* (2013.01); *B60R 1/00* (2013.01); *B60R 2300/808* (2013.01); *B60T 7/12* (2013.01); *B60T 2230/08* (2013.01); *B60W 30/18109* (2013.01); *B62D 15/0285* (2013.01)

(58) Field of Classification Search
CPC ........ B60D 1/36; B60D 1/0246; B60D 1/245; B60D 1/246; B62D 15/025; B62D 15/0285
See application file for complete search history.

(56) References Cited

U.S. PATENT DOCUMENTS

| | | | |
|---|---|---|---|
| 5,951,035 | A | 9/1999 | Phillips, Jr. et al. |
| 8,191,915 | B2 * | 6/2012 | Freese, V ............... B60D 1/36 280/477 |
| 9,352,625 | B2 * | 5/2016 | Frantz ..................... B60D 1/06 |
| 9,434,381 | B2 | 9/2016 | Windeler |
| 9,696,723 | B2 | 7/2017 | Zeng et al. |
| 2014/0012465 | A1 * | 1/2014 | Shank ............... B62D 15/0285 701/36 |
| 2016/0052548 | A1 | 2/2016 | Singh et al. |
| 2019/0339704 | A1 * | 11/2019 | Yu .......................... B62D 13/06 |
| 2019/0346858 | A1 * | 11/2019 | Berkemeier ....... B62D 15/0275 |

FOREIGN PATENT DOCUMENTS

| | | |
|---|---|---|
| GB | 2469438 A | 10/2010 |
| WO | 2013130479 A1 | 9/2013 |

\* cited by examiner

*Primary Examiner* — Michael J Zanelli
(74) *Attorney, Agent, or Firm* — Raymond Coppiellie; Price Heneveld LLP

(57) ABSTRACT

A vehicle hitch assistance system includes a steering system and a controller. The controller acquires position data for a coupler of a trailer, derives a vehicle path to position a center of a hitch ball of the vehicle at an interference offset past a centerline of the coupler in a driving direction of the vehicle path, and outputs a steering control signal to the steering system to maintain the vehicle along the path.

20 Claims, 10 Drawing Sheets

US 10,870,323 B2

COMPENSATION FOR TRAILER COUPLER GEOMETRY IN AUTOMATIC HITCH OPERATION

FIELD OF THE DISCLOSURE

The present disclosure generally relates to a system for assisting in a vehicle-trailer hitching operation. In particular, the present system compensates for trailer coupler geometry in aligning a hitch ball with the coupler during an automated hitching operation.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle hitch assistance system includes a steering system and a controller. The controller acquires position data for a coupler of a trailer, derives a vehicle path to position a center of a hitch ball of the vehicle at an interference offset past a centerline of the coupler in a driving direction of the vehicle path, and outputs a steering control signal to the steering system to maintain the vehicle along the path.

Embodiments of the first aspect of the invention can include any one or a combination of the following features:
the system further includes means for acquiring the position data for the coupler of the trailer;
the means for acquiring may include one or more cameras mounted on the vehicle;
the means for acquiring may further include one or more ultrasonic sensors mounted on a rear of the vehicle, wherein the system uses the one or more cameras to derive an initial iteration of the vehicle path when the vehicle is determined to be above a predetermined threshold distance from the coupler, and the system uses the ultrasonic sensors to derive a refined iteration of the vehicle path when the vehicle is determined to be below a predetermined threshold distance from the coupler;
the position data for the coupler may include position data corresponding with a leading edge of the coupler and one of a distance to the coupler or a width of the coupler, at least one of the distance to the coupler or the width of the coupler may be used to determine the centerline position of the coupler, and the interference offset may correspond with a distance between the leading edge of the coupler and an undercut of the coupler positioned beyond the leading edge in the driving direction;
system of may further include a brake system and outputting a steering control signal to the steering system to maintain the vehicle along the path may be carried out within a hitching operation executed by the controller and further including outputting a brake control signal to the brake system, the steering and brake control signals controlling movement of the vehicle along the vehicle path and stopping movement of the vehicle when the center of the hitch ball is aligned at the interference offset;
an accuracy of the position data may increase during the hitching operation as the vehicle approaches the trailer, and the system may iterate derivation of a remaining portion of the path during the hitching operation, including refining the interference offset based on revised position data including the centerline of the coupler.
the controller may further receive information regarding an accuracy of the interference offset after completion of a hitching operation and may adjust the interference offset based on the information, an undercut in the coupler may define a lower edge of the coupler that is set back from a leading portion of coupler, and the interference offset may be a distance between the lower edge and the leading portion in the driving direction;
the interference offset may be less than a difference between an opening size of the coupler and a diameter of the hitch ball;
the interference offset may be a preset system parameter;
the interference offset may be input or adjustable by a user;
the interference offset may be selected from a plurality of interferences offsets stored in memory accessible by the system, and the plurality of interference offsets may be respectively associated with a plurality of trailers having additional characteristics thereof stored in the memory.

According to another aspect of the present disclosure, a vehicle includes a hitch ball mounted on a rear of the vehicle, a steering system, and a controller. The controller acquires position data for a coupler of a trailer, derives a vehicle path to position a center of the hitch ball at an interference offset past a centerline of the coupler in a driving direction of the vehicle path, and outputs a steering control signal to the steering system to maintain the vehicle along the path.

A method for assisting a vehicle in hitching with a trailer includes acquiring position data for a coupler of the trailer, deriving a vehicle path to position a center of a vehicle hitch ball at an interference offset past a centerline of the coupler in a driving direction of the vehicle path, and generating a steering control signal to maintain the vehicle along the path and outputting the steering control signal to a steering system of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
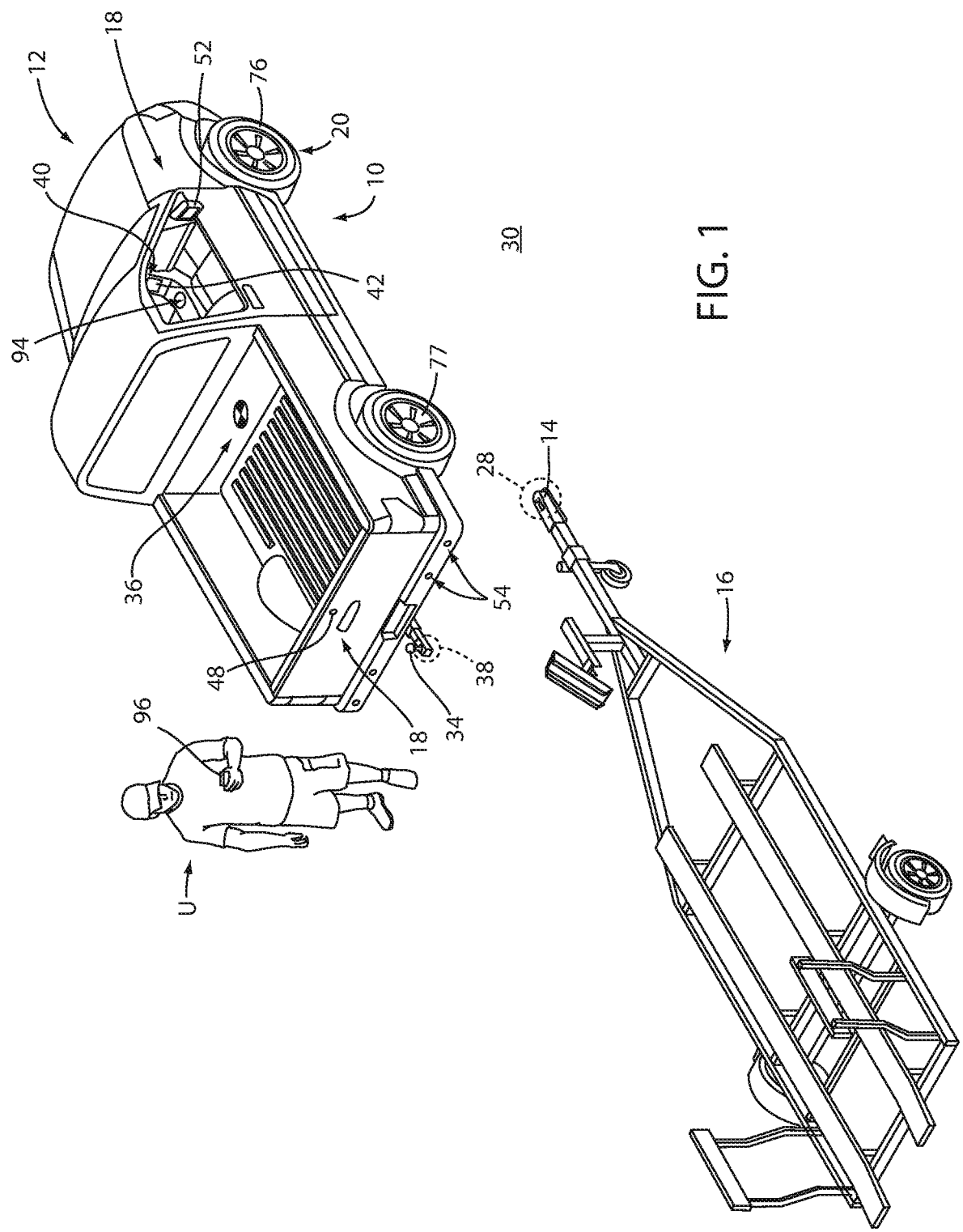
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-11, reference numeral 10 designates a hitch assistance system (also referred to as a "hitch assist" system) for a vehicle 12. In particular, hitch assistance system 10 includes a controller 26 acquiring position data of a coupler 14 of a trailer 16 and deriving a vehicle path 32 to align a hitch ball 34 of the vehicle 12 with the coupler 14. Deriving the vehicle path 32 includes compensating for a determined change in the position 28 of the coupler 14 in a driving direction related to a difference between a vertical position 28 of the coupler 14 in the position data and a height of the hitch ball 34.

Figure 2:
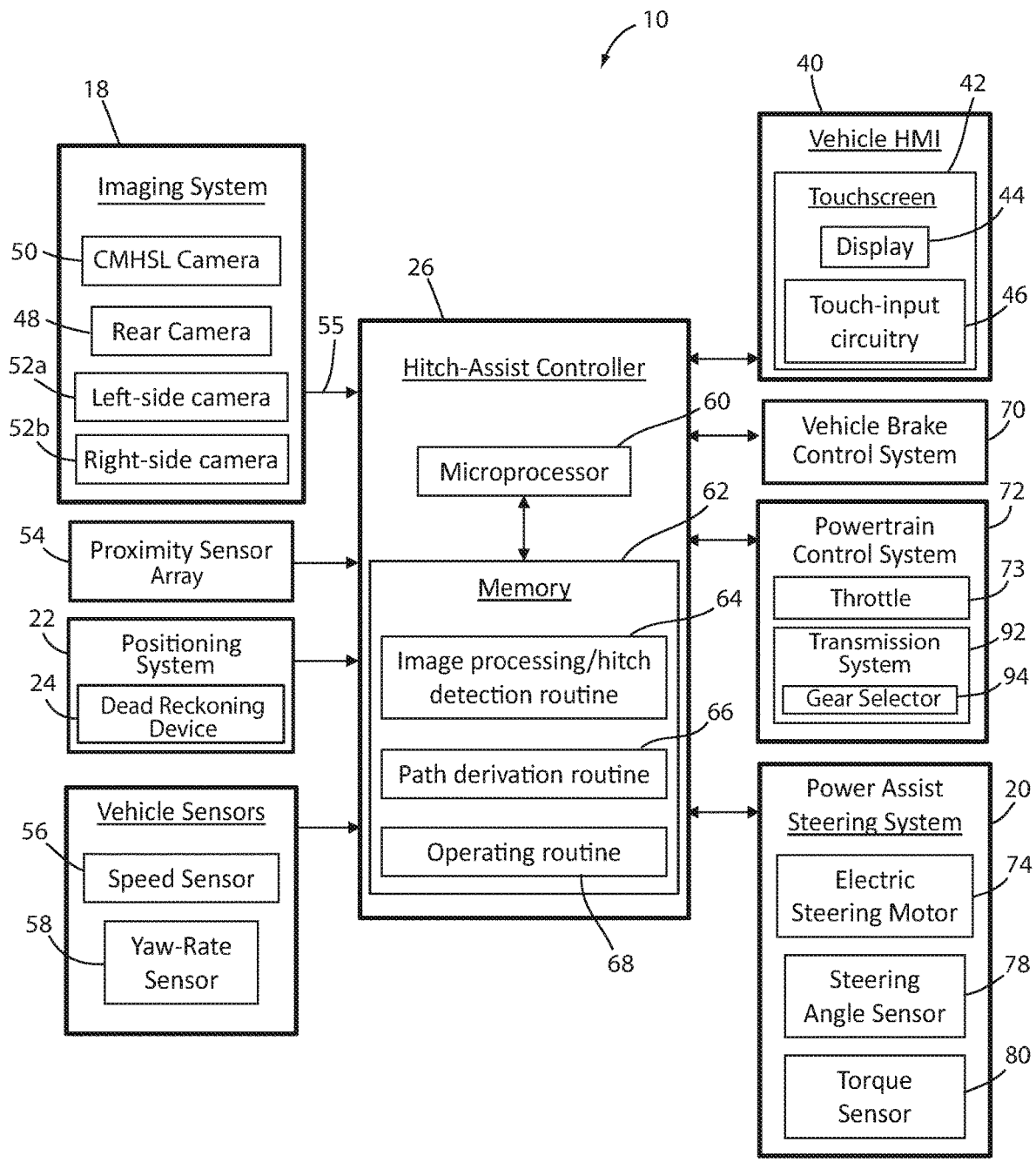
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $α_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 may be provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
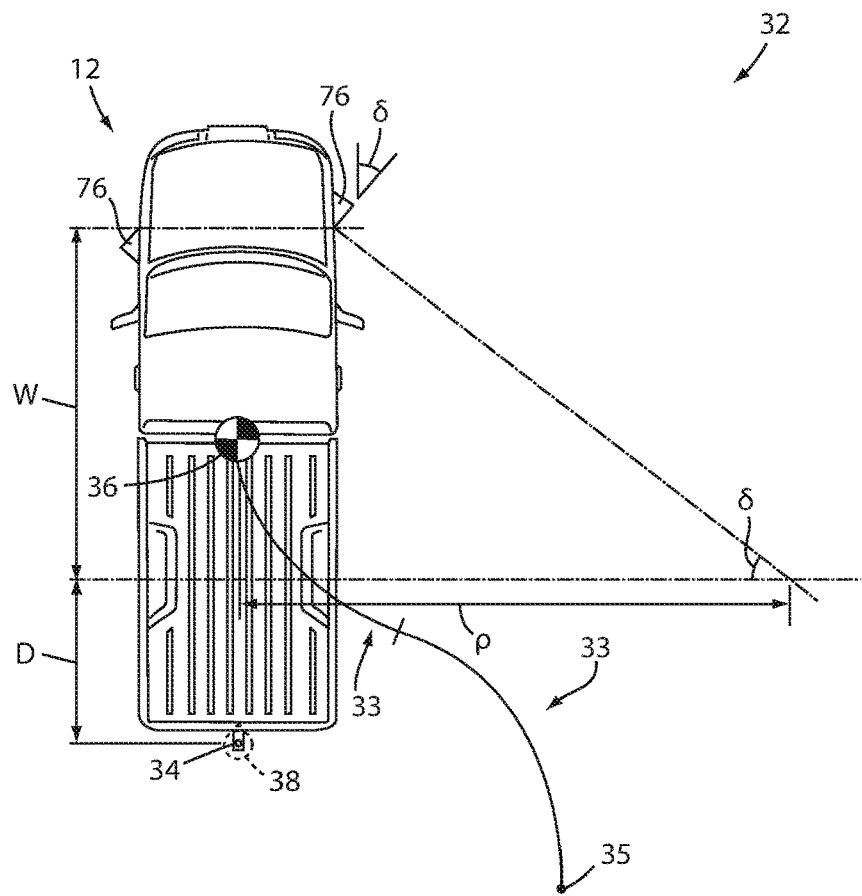
FIG. 3 is an overhead schematic view of a vehicle during a step of the alignment sequence with the trailer.
Figure 3:
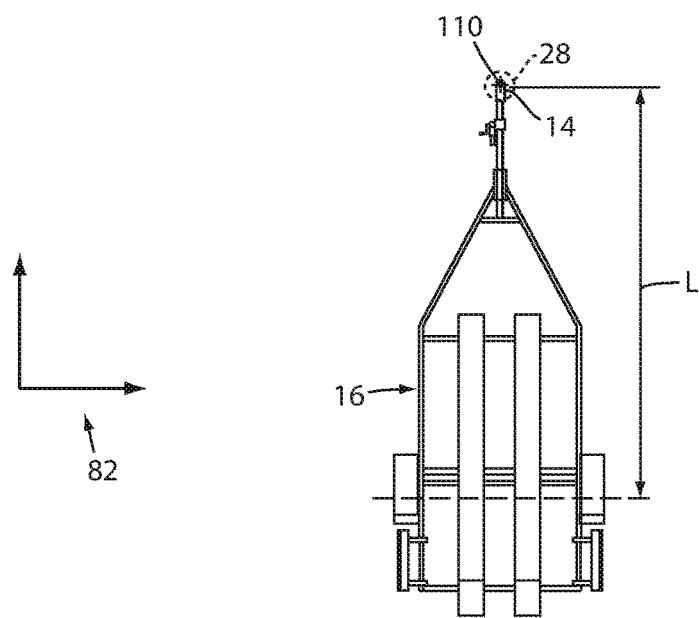

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, as well as using one or more of the cameras 48,50,52a,52b to track the positions of identifiable ground items or portions over time. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which in the depicted arrangement include fields of view 49, 51, 53a, and 53b to correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data 55. In one example, the image processing routine 64 can identify the coupler 14 within the image data 55 based on stored or otherwise known visual characteristics of coupler 14 or hitch couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. Alternatively, the user can visually determine the position 28 of coupler 14 14 within an image presented on HMI 40 and can provide a touch input coupler 14 in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. In the example shown, an initial position of vehicle 12 relative to trailer 16 may be such that coupler 14 is only in the field of view 53a of side camera 52a, with vehicle 12 being positioned laterally from trailer 16 but with coupler 14 being almost longitudinally aligned with hitch ball 34. In this manner, upon initiation of hitch assist system 10, such as by user input on touchscreen 42, for example, image processing routine 64 can identify coupler 14 within the image data 55 of camera 52a and estimate the position 28 of coupler 14 14 relative to hitch ball 34 using the image data 55 in accordance with one of the example discussed above (or a combination of the two examples) or by other known means, including by receiving focal length information within image data 55 to determine a distance $D_c$ to coupler 14 and an angle $\alpha_c$ of offset between coupler 14 and the longitudinal axis of vehicle 12. This information can then be used in light of the position 28 of coupler 14 within the field of view of the image data 55 to determine or estimate the height $H_c$ of coupler 14. Once the positioning $D_c, \alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 3 with additional reference to FIG. 2, controller 26, having estimated the positioning $D_c, \alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a rearward distance to coupler 14 and derive a path 32 that achieves the needed lateral and backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. In further aspects, system 10 can be further configured to shift vehicle 12 between forward-driving gears and the reverse driving gear such that the derivation of path 32 can include both forward and rearward driving of vehicle 12 to achieve the desired lateral movement, as described further in co-pending, commonly-assigned U.S. patent application Ser. No. 15/583,014, the entire contents of which are incorporated by reference herein.

Figure 4:
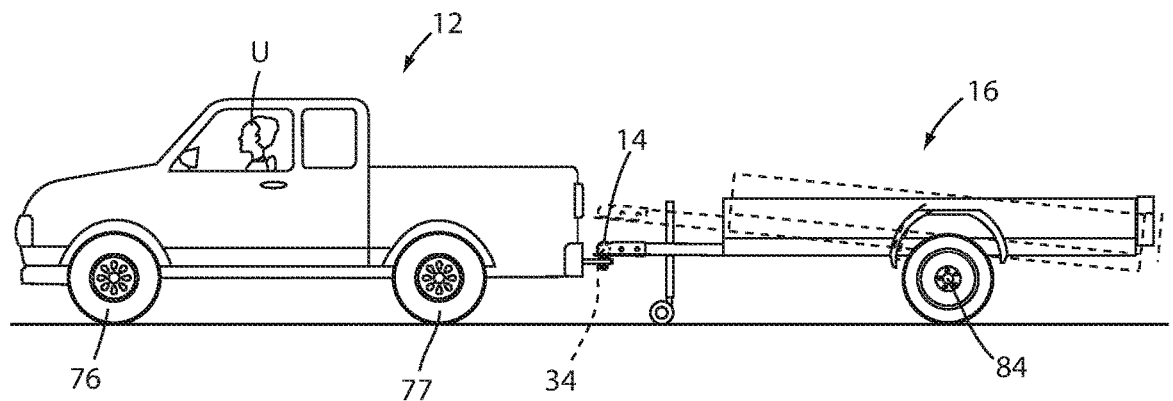
FIG. 4 is a side schematic view showing the trajectory of a trailer coupler during pivoting of the trailer about a point.
Figure 5:
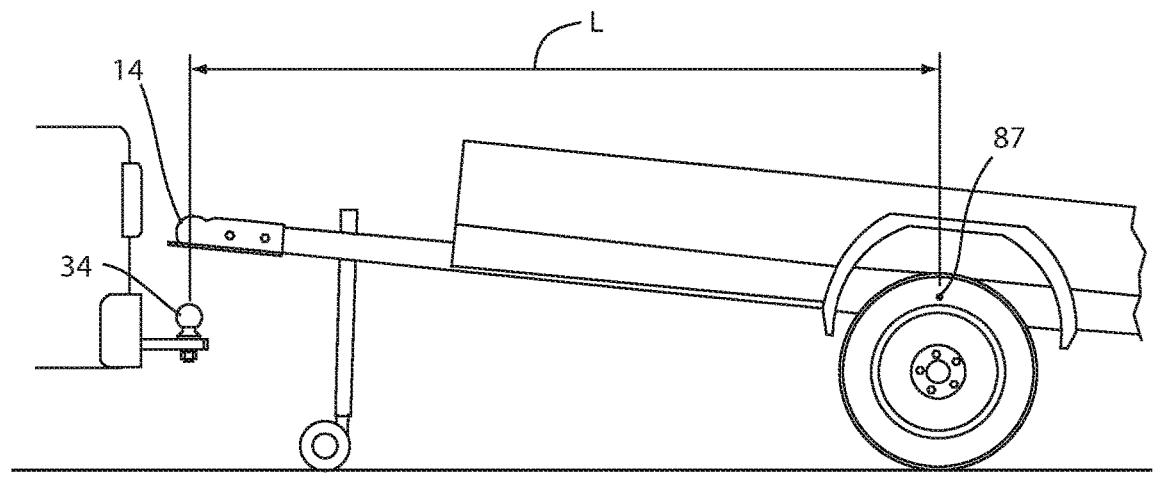
FIG. 5 is a side view showing a vehicle in a hitching operation with a trailer requiring downward movement of the trailer coupler.

As discussed above, path derivation routine 66 can determine the endpoint 35 of path 32 to achieve a desired alignment between hitch ball 34 and coupler 14. In this manner, as shown in FIGS. 4 and 5, the position hitch ball 34 desired for alignment with hitch ball 34 is such that coupler 14 can be lowered onto hitch ball 34 for engagement therewith. In this manner, it is understood that, in an arrangement similar to that used in un-assisted hitching of a trailer 16 to a vehicle 12, coupler 14 is to be in an elevated position above the ground surface on which it is positioned at a height Hc that is higher than the height Hb of the hitch ball 34 such that the reversing of vehicle 12 along path 32 brings hitch ball 34 beneath coupler 14 so that coupler 14 can be lowered onto hitch ball 34.

Figure 6:
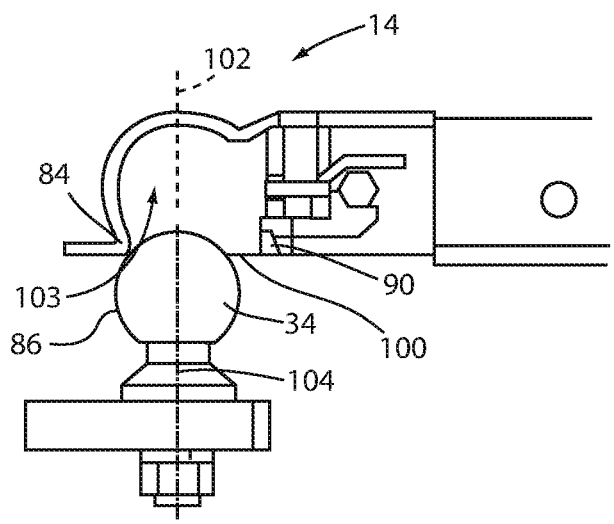
FIG. 6 is a detail view showing the horizontal offset in coupler position resulting from downward movement of the coupler to hitch with a vehicle.
Figure 7A:
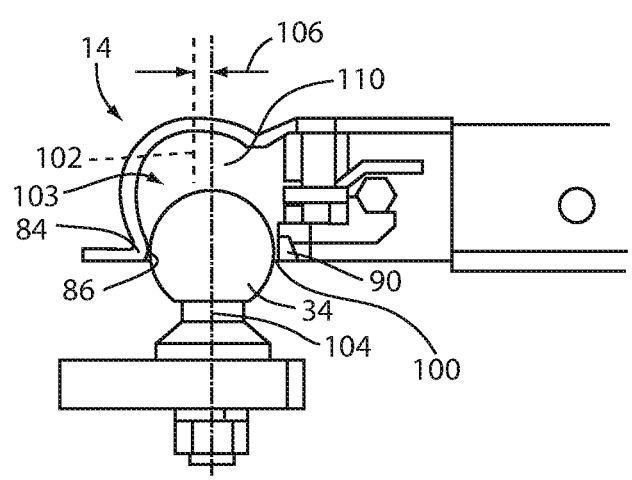
FIGS. 7A and 7B are detail views showing sequential steps in lowering a coupler onto a hitch ball of a vehicle in connection with a system configured to align the vehicle to an offset position with respect to the coupler to account for interference during lowering of the coupler.
Figure 7B:
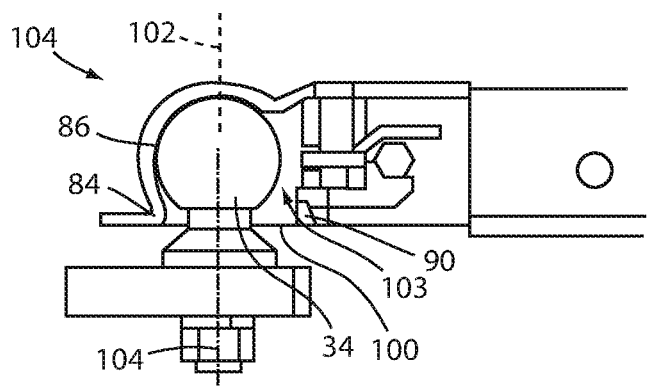

As shown in FIG. 6, it is common for couplers 14 to include an undercut 84 that extends backward relative to the leading portion 86 of coupler 14. The undercut 84 is present to extend around the underside of hitch ball 34 such that hitch ball 34 can be captured within coupler 14. This arrangement helps to prevent coupler 14 from coming dislodged from hitch ball 34 during driving, such as during driving on a bumpy or uneven surface. To further capture hitch ball 34, coupler 14 may include a latch 90 opposite undercut 84. Latch 90 is configured with a portion thereof that selectively extends toward undercut 84 under a portion of hitch ball 34 opposite undercut 84 to secure hitch ball 34 within coupler 14. In a similar manner latch 90 can be withdrawn from under hitch ball 34 to allow coupler 14 to be lifted off of hitch ball 34. In such an arrangement, the retreating movement of latch 90 is such that the opening 100 on the lower face of coupler 14 is set back from the centerline defined by the internal shape of coupler 14. As can be seen in FIGS. 7A and 7B, the shape of the interior 104 of coupler 14 is shaped to match that of hitch ball 34 along a cross-sectional profile extending along the longitudinal axis of vehicle 12. In this manner, the shape of coupler 14, in which the external shape generally follows that of interior 103, defines centerline 102 that, when coupled with hitch ball 34, as shown in FIG. 7B, aligns with the centerline/axis 104 of hitch ball 34. However, due to the rearwardly-positioned center 100 of opening, which is set back from the centerline 102 of coupler 14, direct alignment of the centerline 102 of coupler 14 with the axis 104 of hitch ball 34 when coupler 14 is lowered onto hitch ball 34 can result in undercut 84 contacting the upper face of hitch ball 34 and causing an interference with the assembly of coupler 14 onto hitch ball 34.

As can be appreciated, to lower coupler 14 onto hitch ball 34, hitch ball 34 should be positioned such that its axis 104 is positioned behind the centerline 102 of coupler such that the forward-most point of hitch ball (defined generally along the diameter thereof) is positioned behind the undercut 84 and, overall, such that hitch ball 34 is aligned with opening 100. If vehicle 12 is brought to a position in which the axis of hitch ball 34 is aligned directly or closely with the centerline 102 of coupler 14, then either or both of vehicle 12 and trailer 16 will have to be manually moved to allow undercut 84 to move past the front edge of hitch ball 34. In such an instance, the trailer 16 must be moved against its weight and vehicle may have to be moved by further reversing, or rocked slightly backwards against the force of the park gear and/or parking brake, which may prove difficult. In use of embodiments of the above-described system 10 in executing a reversing operation of vehicle 12 to align hitch ball 34 with coupler 14 for attachment therebetween by lowering of coupler 14 onto hitch ball, criteria by which a hitching operation is deemed successful may minimize manual intervention, including by manual moving of trailer 16 or forcing of coupler 14 into engagement with hitch ball 34 resulting in movement of vehicle 12 and or trailer 16.

Accordingly, system 10, as presently described provides desired alignment between hitch ball 34 and coupler 14, as described above by configuring controller 26 to acquire data relating to the position 28 for coupler 14 of trailer 16 and deriving vehicle path 32 to position the center/axis 104 of a hitch ball 34 of the vehicle 12 at an interference offset 106 past the centerpoint (or centerline) 102 of the coupler 14 in a driving direction 108 associated with the vehicle path 32. As discussed above the controller 26 then and outputs commands in the form of control signals to at least the steering system 20 to maintain the vehicle along the path 32. In general the driving direction 108 may not directly correspond with the exact direction of path 32 but may be more generally considered as a reversing direction of vehicle 12. To that end, the interference offset 106 can be applied to essentially move the endpoint 35 of path 32 rearward of the centerline 102 of coupler to a position 110 more likely to be centrally aligned with opening 100. In this manner, the interference between undercut 84 and hitch ball 34 is removed (or at least greatly reduced) without introducing additional interference between hitch ball 34 and other portions of coupler 14 (including latch 90 or other portions of opening 100). Accordingly, the interference offset 106 may be applied along an axis of the trailer 16 (i.e. laterally aligned with the centerline 102 of coupler 14 in a direction toward the axle of trailer 16.

Figure 8:
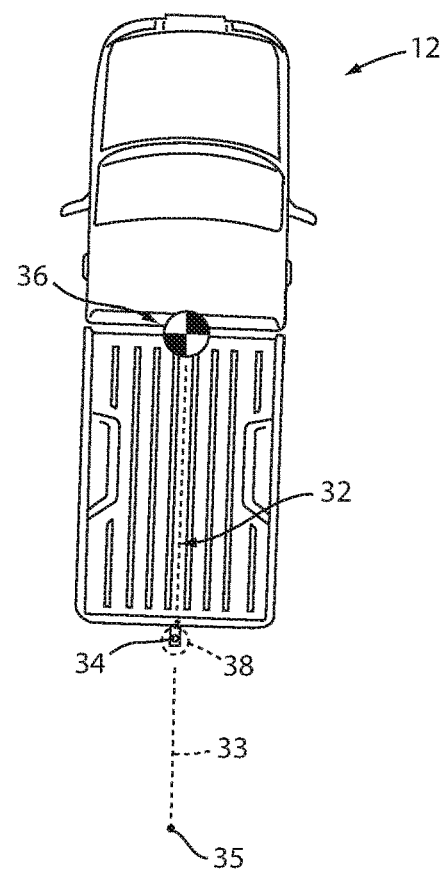
FIG. 8 is an overhead schematic view of the vehicle during a subsequent step of the alignment sequence with the trailer.
Figure 8:
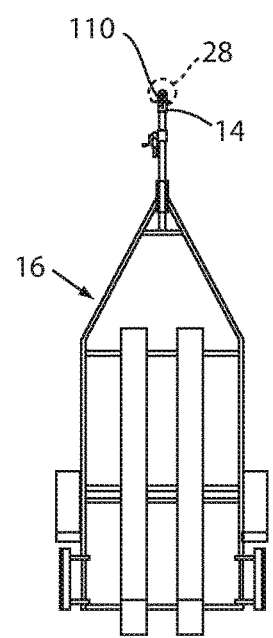
Figure 9:
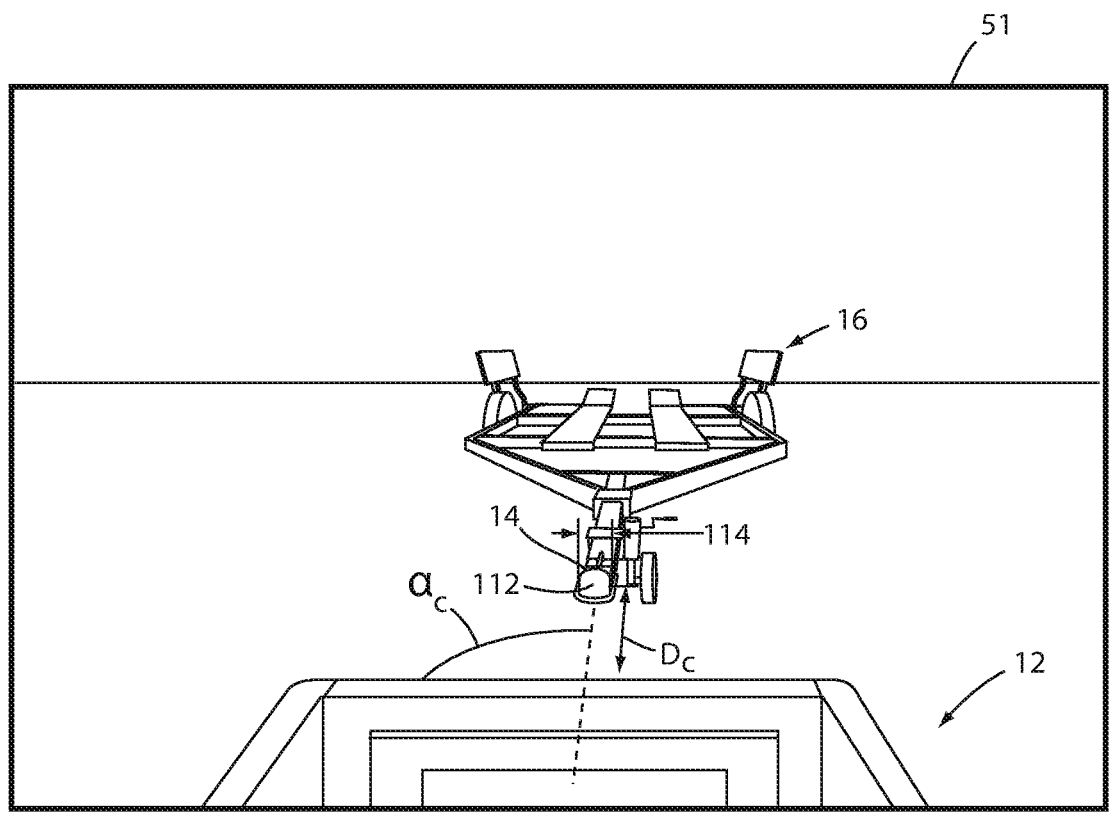
FIG. 9 is a depiction of an image received from a vehicle camera during the alignment sequence step of FIG. 8.

The application of interference offset 106 is preferred in the present application of system 10 to an attempt to determine the center position 110 of opening 100 directly, as determining the particular geometry of coupler 14 may be difficult. In one example, as shown in FIGS. 8 and 9, the data indicating the position 28 of coupler 14 may include data corresponding with a leading edge 112 of the coupler 14, which may be the easiest portion of coupler 14 to detect using available image data 55 or the data received from proximity sensors 54. Any exact determination of the undercut 84 geometry, including the distance by which it extends rearward relative to leading edge 112, may be difficult using such data. System 10, however, may be able to determine the centerline 102 of coupler 14 using the available data. In an example, system 10 may be able to determine the distance Dc to the coupler and a width 114 of the coupler 14 within the image data 51 (i.e. the lateral area of coupler 14 within the image). In this manner, the distance Dc to the coupler 14 and the width 114 of the coupler 14 can be used to determine the centerline 102 position of the coupler 14. In one example, the distance Dc data and the width 114 data within the image 51 can be used to determine the size of coupler 14 by correlating the image width data 114 with the actual size of coupler 14 based on the distance. Because the interior 103 is generally spherical, with the visible portion of the coupler 14 generally matching the interior profile, the distance between the leading edge 112 and the centerline 102 will be approximately equal to half of the width of coupler 14, with such distance being added to the detected distance Dc to the leading edge 112 to determine the centerline 102 position.

In one application of system 10, the interference offset 106 may be a preset system parameter that can essentially be added to the centerline 102 position in the driving direction 108 to achieve the desired endpoint 35 location for path 32 to align coupler 14 with hitch ball 34 as shown in FIG. 7A. By way of example, the preset interference offset 106 may correspond with an average undercut 84 size within an array of couplers 14 on trailers within the towing limits of the particular vehicle 12. In general, such a preset may vary from between about ⅛" to about ½". In further, applications, system 10 may include various different interference offset 106 values stored in memory, which may be scaled to correspond with various widths 114 or categories thereof, which may accordingly, be selected based on the coupler 14 width 114 determination. Further, system 10 may be configured to allow a user to adjust the interference offset 106 (or various selections thereof), including by way of HMI 40. In yet another implementation, controller 26 can continue to receive information from cameras 48,50,52a,52b and/or proximity sensors 54 to determine if trailer 16 is moved after the hitching operation is complete, which can indicate that the hitching operation did not achieve proper alignment of hitch ball axis 104 with the adjusted position 110. Such information can include the distance by which the final position of hitch ball axis 104 was misaligned by determining the closest subsequent position of coupler 14 relative to the vehicle 12 during coupling (indicating the proper position for hitch ball axis 104 for alignment with the adjusted position 110, as well as the position of centerline 102 of coupler 114, based on the final position of coupler 14. System 10 can then use such data to adjust the interference offset 106 to achieve more optimal alignment in a subsequent hitching operation.

Figure 10:
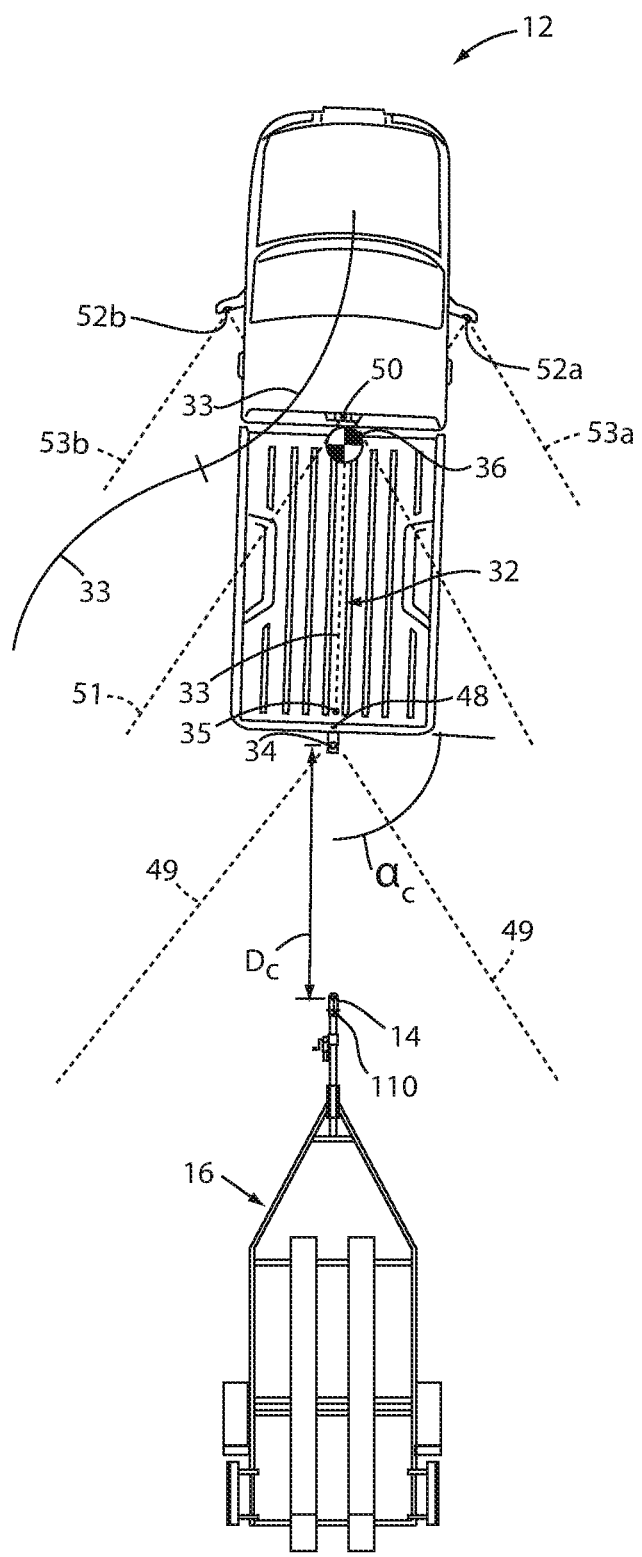
FIG. 10 is an overhead schematic view of the vehicle during a subsequent step of the alignment sequence with the trailer.

As shown in FIGS. 9 and 10, once the path 32 including the determination of endpoint 35 taking into account the desired interference offset 106 has been determined, system 10 controls the reversing of vehicle 12 toward trailer 16 to bring hitch ball 34 closer to alignment with the desired offset position 28. As vehicle 12 approaches trailer 16, the accuracy of the data relating to the position 28 of coupler 14 may increase, such as by providing clearer image data including coupler 14 by cameras 48,50,52a,52b, and/or by bringing vehicle 12 to a position wherein the proximity sensors 54 can be used to detect the position 28 of coupler 14. In this manner, path routine 66 can continue to operate as vehicle 12 maneuvers along path 32 such that a remaining portion of path 32 (such as the portion of path 32 shown in FIG. 10 compared with the initial path of FIG. 8) can be re-iterated or refined based on the updated position 28 data. As can be appreciated, this can be done continuously or once the vehicle 12 reaches a threshold distance Dc to coupler 14 wherein the proximity sensors 54 can be used. The re-iterated or refined path 32 can include a re-iterated or refined determination of the centerline 102 of coupler 14, which can be used to determine the desired adjusted position 110 for hitch ball axis 104 and the endpoint 35 of path 32 that corresponds therewith, based on the desired interference offset 106, which may be selected or determined by any of the above-discussed processes.

Figure 11:
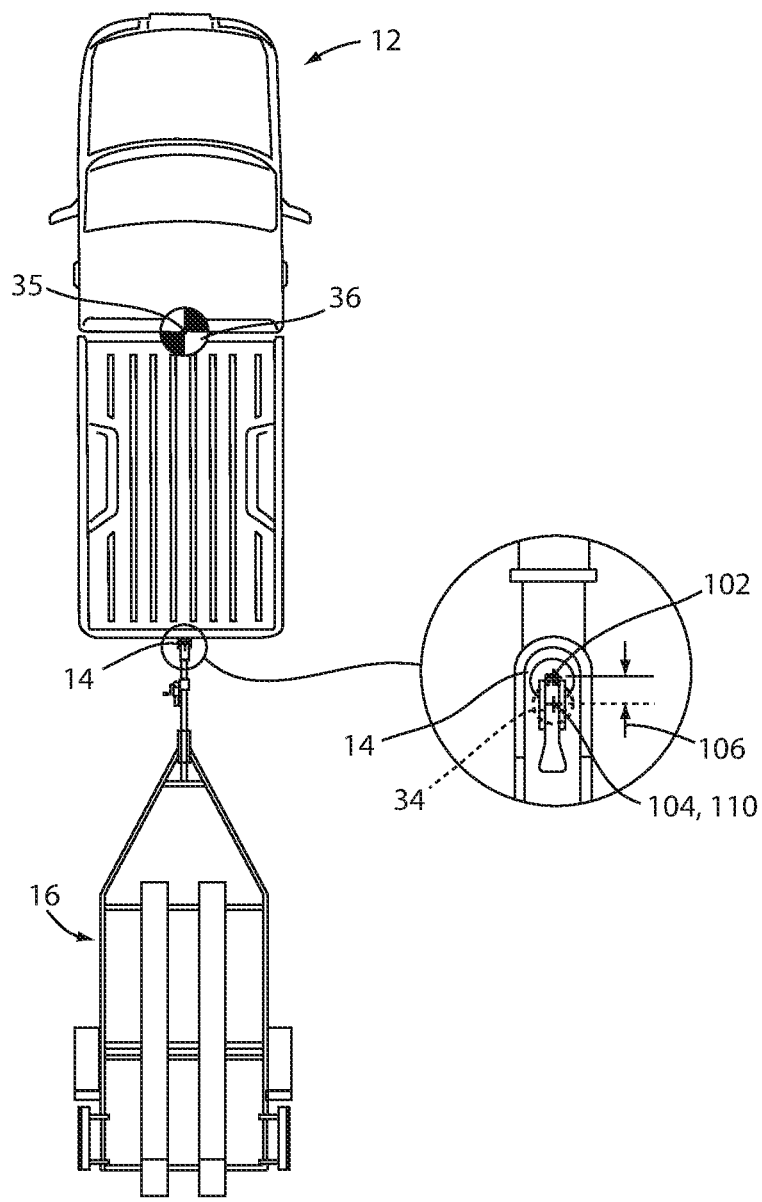
FIG. 11 is an overhead schematic view of the vehicle during a subsequent step of the alignment sequence with the trailer and showing the position of a hitch ball of the vehicle at an end of a derived alignment path.

The above-described determination of the adjusted position 110 of hitch ball axis 104 based on interference offset 106 can be particularly useful in an implementation of system 10 that is configured to output a brake control signal to brake system 70, as discussed above, wherein system 10 can slow vehicle 12 to a stop at the desired endpoint 35 of path 32. In such an implementation, controller 26 can determine path 32 and endpoint 35, as discussed above, and can control the steering and braking of vehicle 12 (and, further optionally, the powertrain system 72) to control movement of vehicle 12 along path 32 to bring vehicle 12 to endpoint 35 of path 32 in the desired orientation of alignment of the axis 104 of hitch ball 34 with the adjusted position 110, as shown in FIG. 11. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 110 thereof relative to the tracked position 28 of coupler 14, as discussed above and shown in FIG. 11.

As discussed above, hitch assist system 10 can provide image data 55 to image processing routine 64 that can be used by image processing routine 64 (by the process described above or by other available processes) to determine the position of hitch ball 34 relative to vehicle 12 (i.e. to determine the particular drawbar length L for a given hitch ball 34 and corresponding mount). Additionally or alternatively, hitch assist system 10 can have stored in memory 62 or can otherwise determine the position of hitch ball 34. In one example, during an initial setup routine for hitch assist system 10, a user can be prompted to install hitch ball 34 by way of assembling a ball mount including hitch ball 34 with a receiver positioned on the rear of vehicle 12. The user can then be asked to measure the distance between of the hitch ball 34 and the vehicle bumper (the position of which can be pre-stored in memory 62) and to enter that measurement into memory 62 by way of HMI 40, for example. The user can also be prompted to enter the diameter of the particular hitch ball, which can be used in combination with the distance information to determine the location of hitch ball axis 104. In this manner, a number of different measurements for a plurality of hitch balls 34 used in connection with the particular vehicle 12 can be stored in memory 62 and can be selected by the user. In another example, hitch ball 34 may be within the field of view 49 of rear camera 48, as shown in FIG. 8, such that image data 55 can be processed to determine the position of hitch ball 34 on a real-time or on-demand basis.

Figure 12:
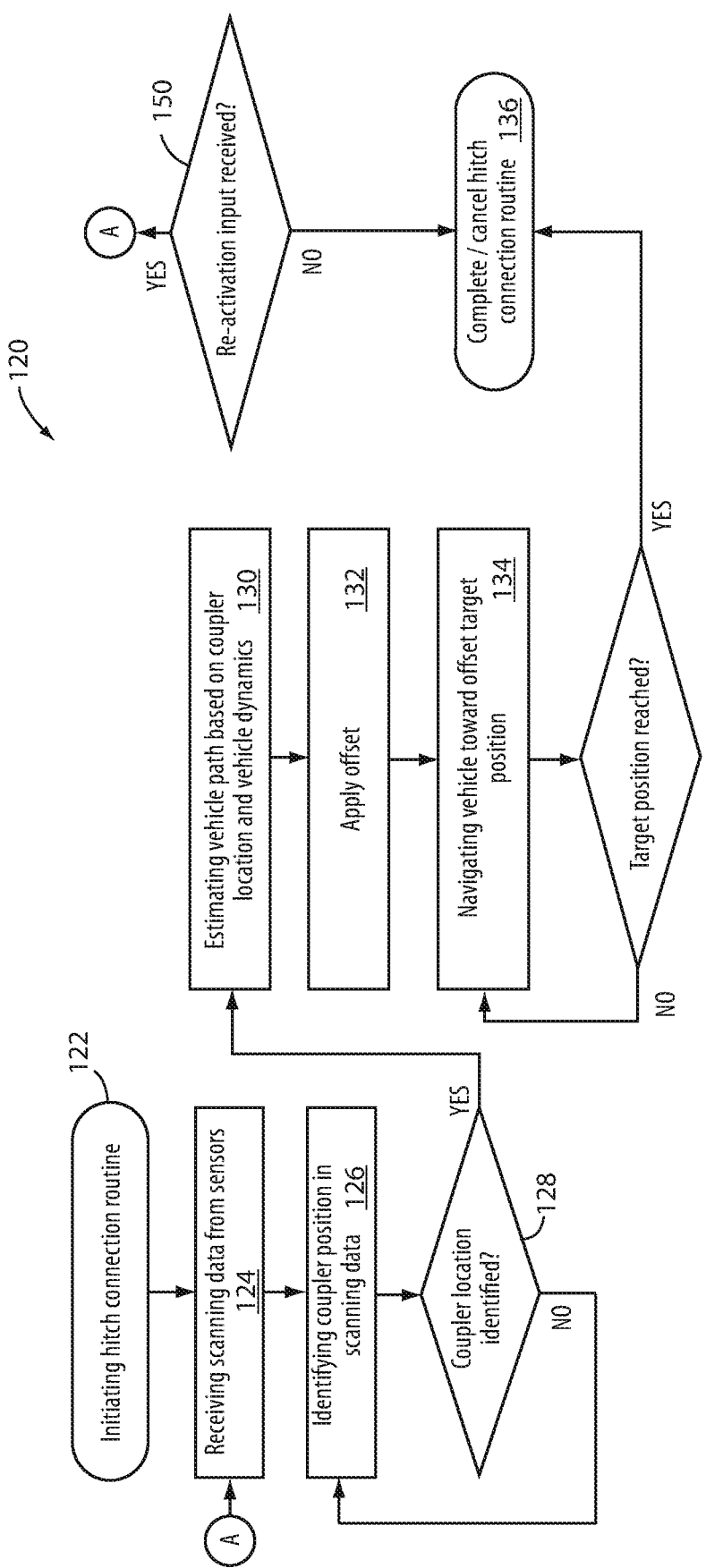
FIG. 12 is a flowchart depicting steps in the alignment sequence.

Turning now to FIG. 12, a flowchart showing steps in a method 120 for using hitch assist system 10 to align a vehicle hitch ball 34 with a trailer coupler 14 is shown. In particular, in step 120, the hitch assist system 10 is initiated. In an example, hitch assist system 10 can be initiated at any point when coupler 14 is in the field of view 49, 51, 53a, 53b of at least one camera 48, 50, 52a, 52b within imaging system 18. Accordingly, once the hitch assist system 10 is initiated, controller 26 can use imaging system 18 to scan the viewable scene using any or all available cameras 48, 50, 52a, 52b, as well as to receive data, if available, from proximity sensors 54 (step 124). The scene scan (step 124) can be used to then identify the centerline 102 coupler 14 and, optionally, the associated trailer, which may be confirmed by the user (step 128). The distance $D_c$, and offset angle $\alpha_c$ of coupler 14, as identified in step 126, can then be determined using the available image data 55 (step 124) as discussed above, including using image processing routine 64. As discussed above, image processing routine 64 can be programmed or otherwise configured to identify coupler 14 of trailer 16 within image data 55 (step 126). In this manner, after the results of the initial scene scan (step 124) are analyzed, controller 26 can determine if coupler 14 has been confirmed by the user (such as by way of HMI 40) in step 128. If coupler 14 has not been confirmed or if a determined coupler 14 has been rejected, the scene scan (step 124) can be continued, including while instructing driver to move vehicle 12 to better align with trailer 16, until coupler 14 is identified. When coupler 14 has been identified and confirmed, the path derivation routine 66 can be used to determine the vehicle path 32 to align hitch ball 34 with coupler 14 in step 130. In this manner, the positioning $D_h$, $\alpha_h$ an of coupler 14 is used to place the coupler 14 within the stored data relating the image coordinates with the real-world coordinates of the area surrounding vehicle 12. After the initial path derivation 130, the interference offset 106 is optionally selected (as discussed above) and applied to the path 32 to adjust the endpoint 35 of path 32 to align the axis 104 of hitch ball 34 with the adjusted position 110 for assembly with coupler 14, as discussed above.

Once the path 32 has been derived, hitch assist system 10 can ask the user to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68) (step 134). When it has been confirmed that user is not attempting to control steering system 20 (for example, using torque sensor 80, as discussed above), controller 26 begins to move vehicle 12 along the determined path 32. Hitch assist system 10 then controls steering system 20 (step 138) to maintain vehicle 12 along path 32 as either user U or controller 26 controls the velocity of vehicle 12 using powertrain control system 72 and braking control system 70. As discussed above, controller 26 or the user can control at least steering system 20, while tracking the position $D_c$, $\alpha_c$ of coupler 14 (step 130) until vehicle 12 reaches endpoint 35, wherein the vehicle 12 hitch ball 34 reaches the desired position 110 for the desired alignment with coupler 14 (step 140), at which point operating routine 68 can end (step 132), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10 (step 136), whereupon system 10 remains inactive until subsequent reactivation thereof (step 150).

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
   a steering system; and
   a controller:
      acquiring position data for a coupler of a trailer;
      deriving a vehicle path to position a center of a hitch ball of the vehicle at an interference offset past a centerline of the coupler in a driving direction of the vehicle path; and
      outputting a steering control signal to the steering system to maintain the vehicle along the path.

2. The hitch assistance system of claim 1, further including means for acquiring the position data for the coupler of the trailer.

3. The hitch assistance system of claim 2, wherein the means for acquiring include one or more cameras mounted on the vehicle.

4. The hitch assistance system of claim 3, wherein the means for acquiring further include one or more ultrasonic sensors mounted on a rear of the vehicle, wherein:
   the hitch assistance system uses the one or more cameras to derive an initial iteration of the vehicle path when the vehicle is determined to be above a predetermined threshold distance from the coupler; and
   the hitch assistance system uses the ultrasonic sensors to derive a refined iteration of the vehicle path when the vehicle is determined to be below a predetermined threshold distance from the coupler.

5. The hitch assistance system of claim 1, wherein:
   the position data for the coupler includes position data corresponding with a leading edge of the coupler and one of a distance to the coupler or a width of the coupler;
   at least one of the distance to the coupler or the width of the coupler is used to determine a position of the centerline of the coupler; and
   the interference offset corresponds with a distance between the leading edge of the coupler and an undercut of the coupler positioned beyond the leading edge in the driving direction.

6. The hitch assistance system of claim 1, further including a brake system, wherein outputting a steering control signal to the steering system to maintain the vehicle along the path is carried out within a hitching operation executed by the controller and further including:
outputting a brake control signal to the brake system, the steering and brake control signals controlling movement of the vehicle along the vehicle path and stopping movement of the vehicle when the center of the hitch ball is aligned at the interference offset.

7. The hitch assistance system of claim 6, wherein:
an accuracy of the position data increases during the hitching operation as the vehicle approaches the trailer; and
the hitch assistance system iterates derivation of a remaining portion of the path during the hitching operation, including refining the interference offset based on revised position data including the centerline of the coupler.

8. The hitch assistance system of claim 6, wherein the controller further:
receives information regarding an accuracy of the interference offset after completion of a hitching operation; and
adjusts the interference offset based on the information.

9. The hitch assistance system of claim 1, wherein:
an undercut in the coupler defines a lower edge of the coupler that is set back from a leading portion of coupler;
the interference offset is a distance between the lower edge and the leading portion in the driving direction.

10. The hitch assistance system of claim 9, wherein the interference offset is less than a difference between an opening size of the coupler and a diameter of the hitch ball.

11. The hitch assistance system of claim 9, wherein the interference offset is a preset system parameter.

12. The hitch assistance system of claim 9, wherein the interference offset is one of input or adjustable by a user.

13. The hitch assistance system of claim 9, wherein:
the interference offset is selected from a plurality of interferences offsets stored in memory accessible by the system; and
the plurality of interference offsets are respectively associated with a plurality of trailers having additional characteristics thereof stored in the memory.

14. A method for assisting a vehicle in hitching with a trailer, comprising:
acquiring position data for a coupler of the trailer;
deriving a vehicle path to position a center of a vehicle hitch ball at an interference offset past a centerline of the coupler in a driving direction of the vehicle path; and
generating a steering control signal to maintain the vehicle along the path and outputting the steering control signal to a steering system of the vehicle.

15. The method of claim 14, further including:
using information received from one or more cameras to derive an initial iteration of the vehicle path when the vehicle is determined to be above a predetermined threshold distance from the coupler; and
using information received from one or more ultrasonic sensors to derive a refined iteration of the vehicle path when the vehicle is determined to be below the predetermined threshold distance from the coupler.

16. The method of claim 14, wherein:
the position data for the coupler includes position data corresponding with a leading edge of the coupler and one of a distance to the coupler or a width of the coupler;
at least one of the distance to the coupler or the width of the coupler is used to determine the centerline position of the coupler; and
the interference offset corresponds with a distance between the leading edge of the coupler and an undercut of the coupler positioned beyond the leading edge in the driving direction.

17. The method of claim 14, wherein outputting a steering control signal to the steering system to maintain the vehicle along the path is carried out within a hitching operation further including:
generating a brake control signal to stop movement of the vehicle when the center of the hitch ball is aligned at the interference offset; and
outputting the brake control signal to a vehicle brake system.

18. The method of claim 17, further including iterating derivation of a remaining portion of the path during the hitching operation, including refining the interference offset based on revised position data including the centerline of the coupler.

19. The method of claim 14, wherein:
an undercut in the coupler defines a lower edge of the coupler that is set back from a leading portion of coupler;
the interference offset is a distance between the lower edge and the leading portion in the driving direction.

20. A vehicle, comprising:
a hitch ball mounted on a rear of the vehicle;
a steering system; and
a controller:
acquiring position data for a coupler of a trailer;
deriving a vehicle path to position a center of the hitch ball at an interference offset past a centerline of the coupler in a driving direction of the vehicle path; and
outputting a steering control signal to the steering system to maintain the vehicle along the path.

* * * * *